United States Patent
Gaumann et al.

(10) Patent No.: US 8,246,075 B2
(45) Date of Patent: Aug. 21, 2012

(54) AIRBAG MODULE FOR A VEHICLE OCCUPANT RESTRAINT SYSTEM

(75) Inventors: Udo Gaumann, Aschaffenburg (DE); Frank Sauer, Niedernberg (DE); Steffen Weigand, Aschaffenburg (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/212,906

(22) Filed: Aug. 18, 2011

(65) Prior Publication Data

US 2011/0298199 A1     Dec. 8, 2011

Related U.S. Application Data

(63) Continuation of application No. PCT/EP2010/058467, filed on Jun. 16, 2010.

(30) Foreign Application Priority Data

Jun. 19, 2009   (DE) .................. 10 2009 030 149

(51) Int. Cl.
*B60R 21/215* (2011.01)
*B60R 21/2165* (2011.01)

(52) U.S. Cl. ................ 280/728.3; 280/731; 280/732

(58) Field of Classification Search ............. 280/728.2, 280/728.3, 731, 732
See application file for complete search history.

(56) References Cited

U.S. PATENT DOCUMENTS

| | | |
|---|---|---|
| 3,640,546 A | 2/1972 | Brawn |
| 3,756,617 A | 9/1973 | Brown |
| 5,062,663 A | 11/1991 | Satoh |
| 5,183,288 A | 2/1993 | Inada et al. |
| 5,201,541 A | 4/1993 | Jones et al. |
| 5,411,288 A | 5/1995 | Steffens, Jr. |
| 5,460,402 A | 10/1995 | Rhodes, Jr. |
| 5,741,024 A | 4/1998 | Enders |
| 5,762,361 A | 6/1998 | Herrmann et al. |
| 5,829,777 A | 11/1998 | Sakurai et al. |

(Continued)

FOREIGN PATENT DOCUMENTS

DE   2 045 245   5/1971

(Continued)

OTHER PUBLICATIONS

Definition: Interface, Merriam-Webster's Online Dictionary, available at, http://www.meriam-webster.com/dictionary/interface (last visited Jul. 30, 2011).

(Continued)

*Primary Examiner* — Joseph Rocca
(74) *Attorney, Agent, or Firm* — Foley & Lardner LLP (57) ABSTRACT

An airbag module for a vehicle occupant restraint system is provided. The airbag module comprising an airbag and having a visible surface, facing the vehicle interior when installed, which is formed by different segments of the airbag module, wherein at least two of the segments have optically and/or haptically different surfaces. At least two of the segments each have at least one mechanical interface by means of which they can be mechanically connected to at least one of the other segments, forming a connecting area, and at least one of the segments forms at least one tear line, wherein upon tearing open the tear line in the event of deployment an opening is produced in the visible surface through which the airbag can exit the airbag module. Here the mechanical interfaces are designed in such a way that upon tearing open the tear line they endure and do not open.

16 Claims, 5 Drawing Sheets

U.S. PATENT DOCUMENTS

| | | | |
|---|---|---|---|
| 6,158,764 A * | 12/2000 | Preisler et al. | 280/728.2 |
| 6,402,189 B1 | 6/2002 | Gray et al. | |
| 6,426,473 B1 | 7/2002 | Derrick et al. | |
| 6,435,542 B2 | 8/2002 | Nakashima et al. | |
| 6,443,484 B2 | 9/2002 | Anglsperger | |
| 6,546,659 B1 | 4/2003 | Imai et al. | |
| 6,613,415 B2 | 9/2003 | Iida et al. | |
| 7,261,314 B2 * | 8/2007 | Schneider et al. | 280/728.3 |
| 7,287,618 B2 | 10/2007 | Okamoto et al. | |
| 2002/0005631 A1 | 1/2002 | Varcus et al. | |
| 2002/0163172 A1 | 11/2002 | Mochizuki et al. | |
| 2003/0178819 A1 | 9/2003 | Schneider et al. | |
| 2003/0209889 A1 | 11/2003 | Erwin et al. | |
| 2005/0263988 A1 | 12/2005 | Welford | |
| 2005/0263989 A1 | 12/2005 | Helmstetter | |
| 2005/0275197 A1 | 12/2005 | Kaifuki et al. | |
| 2006/0000065 A1 | 1/2006 | Takasawa et al. | |
| 2006/0202449 A1 | 9/2006 | Yokota et al. | |
| 2007/0126216 A1 | 6/2007 | Nakamura et al. | |
| 2007/0158932 A1 | 7/2007 | Taniyama et al. | |
| 2008/0100040 A1 | 5/2008 | DePottey et al. | |
| 2010/0295271 A1 | 11/2010 | Shimazaki et al. | |

FOREIGN PATENT DOCUMENTS

| | | |
|---|---|---|
| DE | 299 18 483 U1 | 4/2000 |
| DE | 200 16 493 U1 | 1/2001 |
| DE | 101 64 210 A1 | 7/2003 |
| DE | 103 07 334 A1 | 9/2004 |
| DE | 11 2005 001 219 T5 | 12/2005 |
| DE | 10 2006 029 424 A1 | 1/2008 |
| EP | 1 602 534 A1 | 12/2005 |
| EP | 1 607 278 A1 | 12/2005 |
| EP | 1 611 812 A1 | 1/2006 |
| WO | WO-03/076230 A2 | 9/2003 |
| WO | WO 2009/022500 A1 | 2/2009 |

OTHER PUBLICATIONS

International Search Report in PCT/EP2010/058467 dated Nov. 4, 2010.

Color Photographs representing the airbag module used in the passenger car model Fiat 500 (model year 2007/2008), Automobile Manufacturer FIAT SPA, 7 pages.

* cited by examiner

AIRBAG MODULE FOR A VEHICLE OCCUPANT RESTRAINT SYSTEM

CROSS-REFERENCE TO A RELATED APPLICATION

This application is a continuation of International Patent Application Number PCT/EP2010/058467, filed on Jun. 16, 2010, which was published in German as WO 2011/003710. The foregoing international application is incorporated by reference herein.

BACKGROUND

The invention relates to an airbag module for a vehicle occupant restraint system.

There is an increasing desire in the interior design of motor vehicles to make available a high degree of individualization by individual shape and colour designs.

Publication DE 101 64 210 A1 specifies an interior cladding in a vehicle which covers an exit area of an airbag. In one embodiment it is provided that the exit area is positioned in a decorative inset of the interior cladding. Publication DE 200 16 493 U1 manifests a cladding element for the interior lining of a passenger motor vehicle, which is made of an elongated, rigid supporting plate, which is concavely arched toward the passenger compartment and is furnished with a decorative cover. A tear seam, making available a passage opening for an airbag, here extends over the visible surface of the supporting plate and the decorative cover.

The passenger car model Fiat 500 (model year 2007/2008) by the automobile manufacturer Fiat SpA implements an airbag module with a visible surface, formed by two parts with different surfaces, wherein the one part is designed to be in the middle and, in the event of deployment, completely separates itself from the surrounding part of the frame by unlatching. In its unlatched state it is held on the module by a strap.

SUMMARY

An object of the present is to make available an airbag module for a vehicle occupant restraint system, which allows for improved opportunities for design.

According to an exemplary embodiment of the invention an airbag module for a vehicle occupant restraint system is provided, comprising an airbag and having a visible surface, facing the vehicle interior when installed, formed by different segments of the airbag module, wherein at least two of the segments have optically and/or haptically different surfaces. It is provided that at least two of the segments each have at least one mechanical interface, by means of which they can be mechanically connected with at least one of the other segments, forming a connecting area, and at least one of the segments forms at least one tear line, wherein upon tearing open the tear line in the event of deployment an opening in the visible surface is produced, through which the airbag can exit the airbag module. The mechanical interfaces are here designed in such a way that upon tearing open the tear line they endure and do not open. The tear line for making available an opening for the unfolding airbag is therefore constructed separate from the mechanical interfaces for the connection of two segments.

The solution according to the invention allows the realization of surfaces which differ from each other optically and/or haptically, and therefore a different styling of different segments which form the visible surface of the airbag module. The visible surface can be divided into different styling segments. The individual segments can undergo a surface refinement independently of the other segments, such that a surface refinement of one of the segments does not lead to additional costs for other, non-refined segments. The separation of the tear line for making available an opening for the unfolding airbag from the mechanical interfaces for connecting two segments makes it possible here to divide the visible area of the airbag module into different segments primarily according to aspects of design, e.g. with regard to size and position of the individual segments, as the functionality of the tearing open of the visible area in the event of deployment is made available by one or multiple tear lines which are constructed independent of the mechanical interfaces.

Here it can be chosen optionally which of the different segments forming the visible surface of the airbag module are supplied with a surface refinement or a specific styling. With that it is in particular possible to furnish deliberately defined segments, depending on customer request, with a specific surface.

Two surfaces differ from each other optically, as defined by the present invention, if they have a different colour and/or different light reflection properties, for example form different gloss or matt values. Two surfaces differ from each other haptically as defined by the present invention when they are made of different materials and/or have different surface structures. An optically and/or haptically different embodiment of a surface is also called surface refinement. The different surface refinement is accompanied by a different styling of a considered segment.

In one exemplary embodiment of the invention it is provided that the tear line is designed in such a way that it runs along (i.e. on, parallel to or adjacent to) a mechanical interface. The tear line is here, however, independent of the mechanical interface and not formed by said mechanical interface. The tear line in this embodiment essentially follows the connecting line of two segments and therefore runs for example at the least in one partial area essentially along at least one segment boundary. The division of the visible surface in this case corresponds to the course of the openings for the airbag release. This is especially effective because no separate structuring of the segments outside of the connecting area is required.

Depending on how the tear line is designed in one of the segments, upon tearing open the tear line the mechanical connecting area, formed by the mechanical interfaces, can change its spatial position, it can for instance swing open along with a segment, or it can remain with its spatial position unchanged. In any case, the mechanical interfaces between the segments do not open upon tearing open the tear line.

In another exemplary embodiment of the invention it is on the other hand provided that the tear line is designed in such a way in one segment that it does not follow the mechanical interface of the segments. Here, advantage is taken of the fact that the tear line according to the present invention is designed to be separate from the mechanical interfaces, such that it can run a different course, with the advantage of an additional freedom of design in the choice of the size and shape of the individual segments.

In one exemplary embodiment of the invention it is provided that the mechanical interfaces essentially run along the segment boundaries, although this is not imperatively the case. It is further provided that the mechanical connection between two segments formed by two interfaces is inseparable, i.e. the interfaces do not open under force effect, in particular upon an inflation of the airbag in the event of deployment. For the realization of the interfaces any kind of mechanical connecting means can be provided, for example positive locking elements, corresponding to each other, in the areas that are to be connected or adhesive means.

The different segments of the airbag module which are forming the visible surface are in one embodiment formed by a cover cap, which swings and/or tears open at the least in part in the event of deployment, and/or by visible areas of a module casing of the airbag module. For example, the visible surface is formed by a first segment, formed by the cover cap, and a second segment, formed by a cap frame designed on the module casing. In another example the different segments are formed by different segments of a modular cover cap of the airbag module.

In a further exemplary embodiment of the invention it is provided that for the realization of an optically and/or haptically different surface the surface of one segment is formed by a plastic foil. With this, different foil designs can be applied without having to change the carrier material. To create such a surface refinement, for example, a pre-decorated foil is back injection moulded with a plastic suitable for injection moulding. Hereby, for example, smooth, high-gloss surfaces can be created on soft airbag substrates. Alternatively, however, other procedures, such as for example adhesive bonding, hot stamping, dip printing etc for the application of a refining surface are also possible.

Instead of on the basis of a plastic foil a back injection moulding of a surface material can also take place with other carriers or laminates. For example, a fabric or a leather cutting can be back injection moulded. In any case, the back injection moulding of a surface material has the advantage that the flexibility of the back injection moulded area is maintained. This is especially advantageous when the segment, which is furnished with a surface refinement, is positioned in the area of the exit plane of the airbag of the airbag module.

In case of a back injection moulding of one segment with a plastic foil, the plastic foil constitutes the surface of the considered segment facing the vehicle occupant. It can here be provided to use special types of foil, having a high scratch resistance, as styling surface. This is in particular advantageous with high-gloss and smooth surfaces.

The individual segments are connected to each other only after attaching a surface refinement to at least one of the segments. This has the advantage that the transition between the different segments is clearly marked-off against each other on account of connecting the individual segments only after attaching a surface refinement. The individual segments are therefore distinctly and clearly marked-off against each other.

It can furthermore be provided that a tear line for the unfolding airbag runs within one segment and is here concealed by the refining surface of the corresponding segment. For example, a segment is formed by a back injection moulded plastic foil. After the formation of the tear lines in the plastic these are concealed by the plastic foil, such that they are not visible, and optical impairments, often occurring in the area of tear lines, such as streaks can be reliably avoided. Beyond that, due to the surface refinement, the connecting area of a refined segment with another segment can also be concealed. Altogether, this leads to a drop in rejection rates and in possibly necessary cost-intensive measures on the production tools.

Due to the covering of a tear line by the surface refinement there is, beyond that, the possibility to open a tear line locally (namely to perforate) to achieve that upon deployment of the airbag opening the cap is easier. Such a perforation would be problematic without a covering surface refinement for aesthetic reasons. In this respect, the surface refinement enhances the possible ways to realize the formation of tear lines in a cover cap or in segments forming a cover cap.

It is pointed out that the optically and/or haptically different surfaces of the segments, forming the visible surface of the airbag module, can be furnished with further components, for example with emblems or decorative elements. These are stuck for example on a segment, which is furnished with a surface refinement. The connection can take place for example by thermal welding, adhesive bonding, latching etc. By attaching such emblems or decorative elements to conventionally designed visible surfaces, however, no optically and/or haptically different surfaces as defined by the present invention are made available, because such emblems and decorative elements, for one thing, do not directly form the surface of a considered segment and, for another, cover only partial areas of the visible surface of a segment.

BRIEF DESCRIPTION OF THE DRAWINGS

The invention will subsequently be further explained referring to the figures of the drawing with the help of several exemplary embodiments.

DETAILED DESCRIPTION

Figure 1:
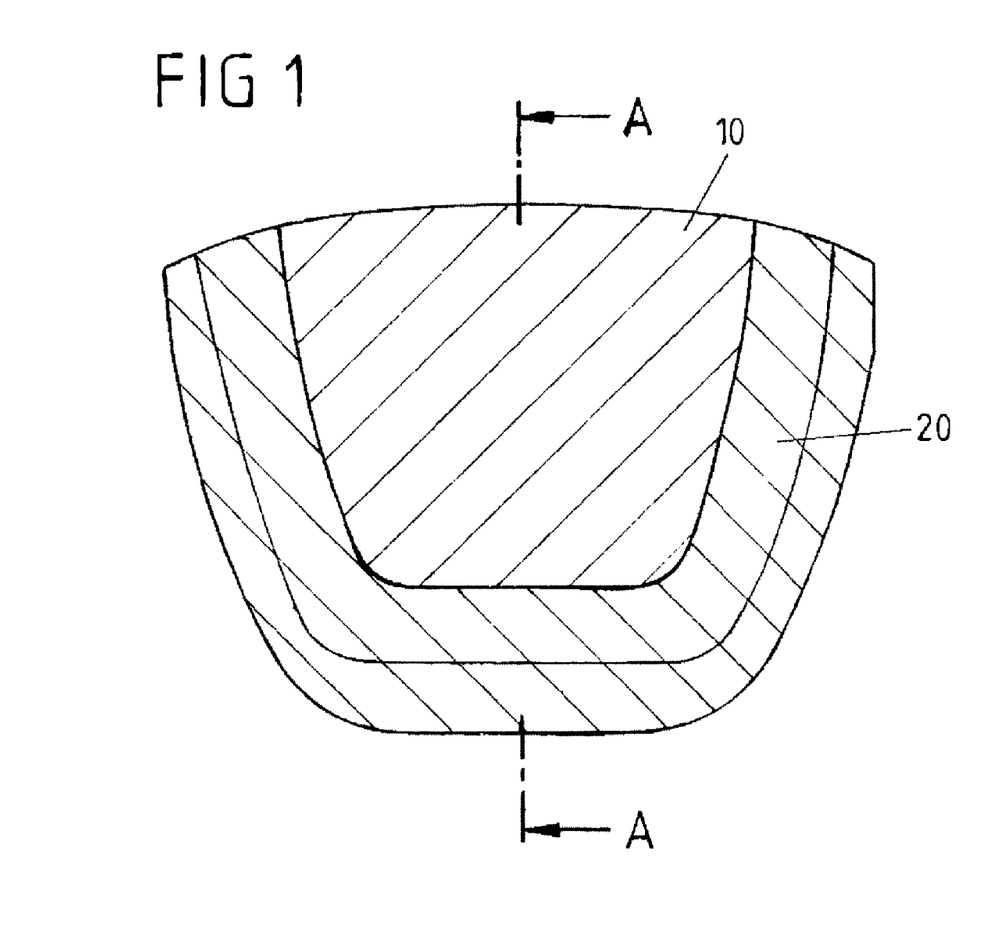
FIG. 1 shows in top view the visible surface of an airbag module according to an exemplary embodiment of the invention.

FIG. 1 shows an exemplary embodiment of an airbag module having a visible surface which is formed by two different segments 10, 20. In the illustration of FIG. 1 the two segments 10, 20 are hatched differently to make the distinction easier.

Figure 2:
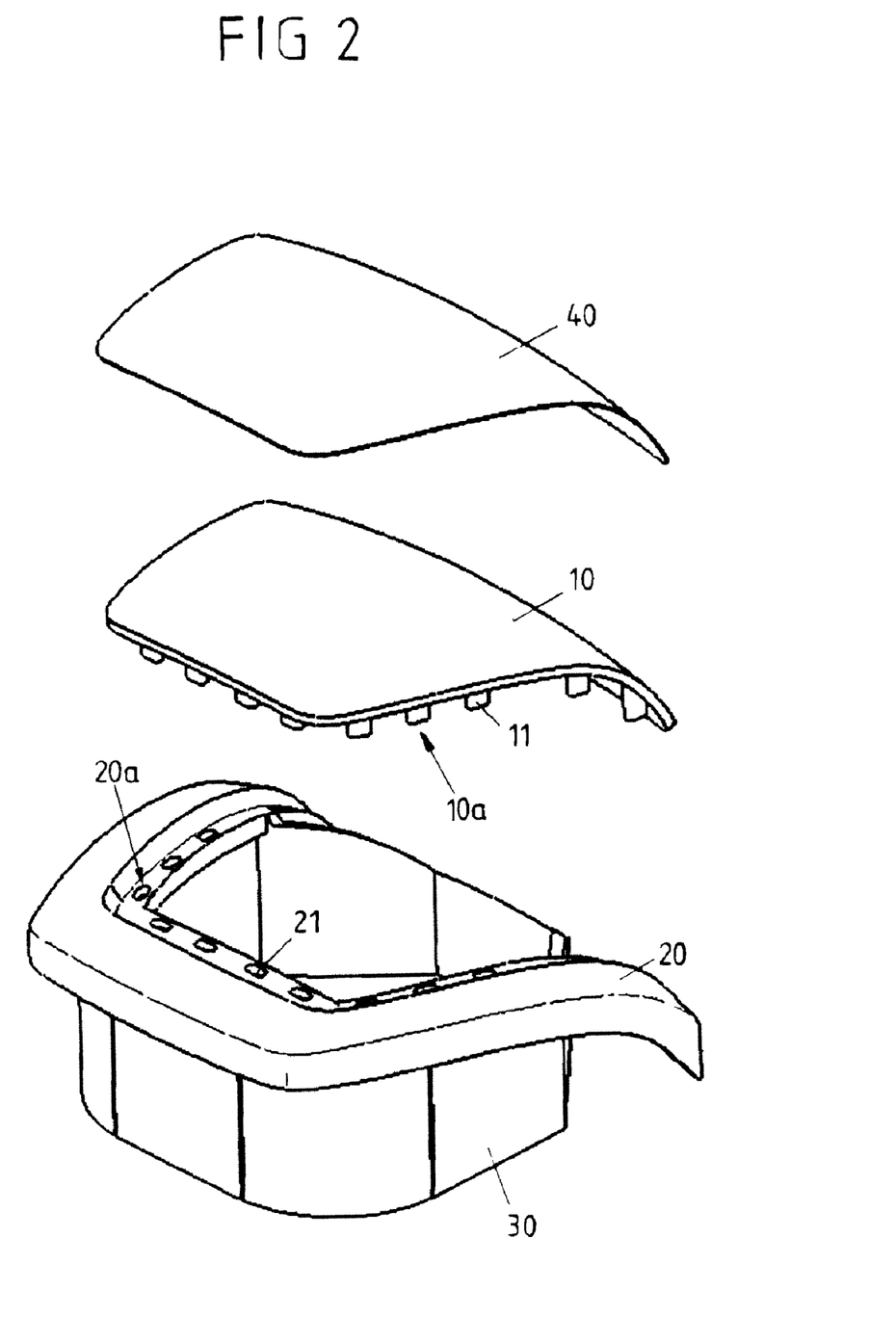
FIG. 2 shows in explosive view the components of the airbag module of FIG. 1.

As can be seen in the explosive view of FIG. 2, the one segment is a cover cap 10 of the airbag module. The other segment is formed by a cap frame 20, designed to be on the upper side of a module casing 30 of the airbag module, said upper side facing the vehicle interior. The module casing 30 serves the housing of a gas generator, not illustrated, and of the airbag.

The airbag module is a driver airbag module, located in the hub area of the steering wheel of the vehicle. FIG. 1 shows a top view from the point of view of a driver with no illustration of the steering wheel spokes and the steering wheel rim.

According to FIG. 2, furthermore, a plastic foil 40 is provided, which is, for example, a high-gloss foil and is located on the cover cap 10. The connection of the plastic foil 40 to the cover cap 10 takes place here before the cover cap 10 is placed onto the cap frame 20. The connection can take place for example by adhesive bonding, hot stamping etc. In one embodiment, forming a joint unit of plastic foil 40 and cover cap 10, the plastic foil 40 is back injection moulded with a plastic, which can be injection moulded, which then forms the cover cap 10.

The cover cap 10 has due to the plastic foil 40 for example a smooth, high-gloss surface. Depending on the type and configuration of the plastic foil, various colours, gloss values, surface structures and decorations can be realized. In one embodiment the foil 40 here has a high scratch resistance. On account of the surface refinement 40 the cover cap 10 forms a styling area of the visible surface.

For connecting the cover cap 10, furnished with the plastic foil 40, to the cap frame 20 for example protrusions 11 in the form of welding domes are designed to be on the cover cap 10 which engage with the recesses 21 of the cap frame 20 and are fastened in these said recesses for example by means of ultrasonic welding, wherein a mechanical connection is produced which is inseparable. The protrusions 11 here form a mechanical interface 10a of the cover cap and the recesses 21 form a mechanical interface 20a of the cap frame. Alternatively, the connection can be designed to be inseparable in another manner, for example it can take place with rivets or adhesive surfaces.

The cap frame 20 in one embodiment has no surface refinement. It is, however, basically possible to also furnish the cap frame with a surface refinement.

Figure 3:
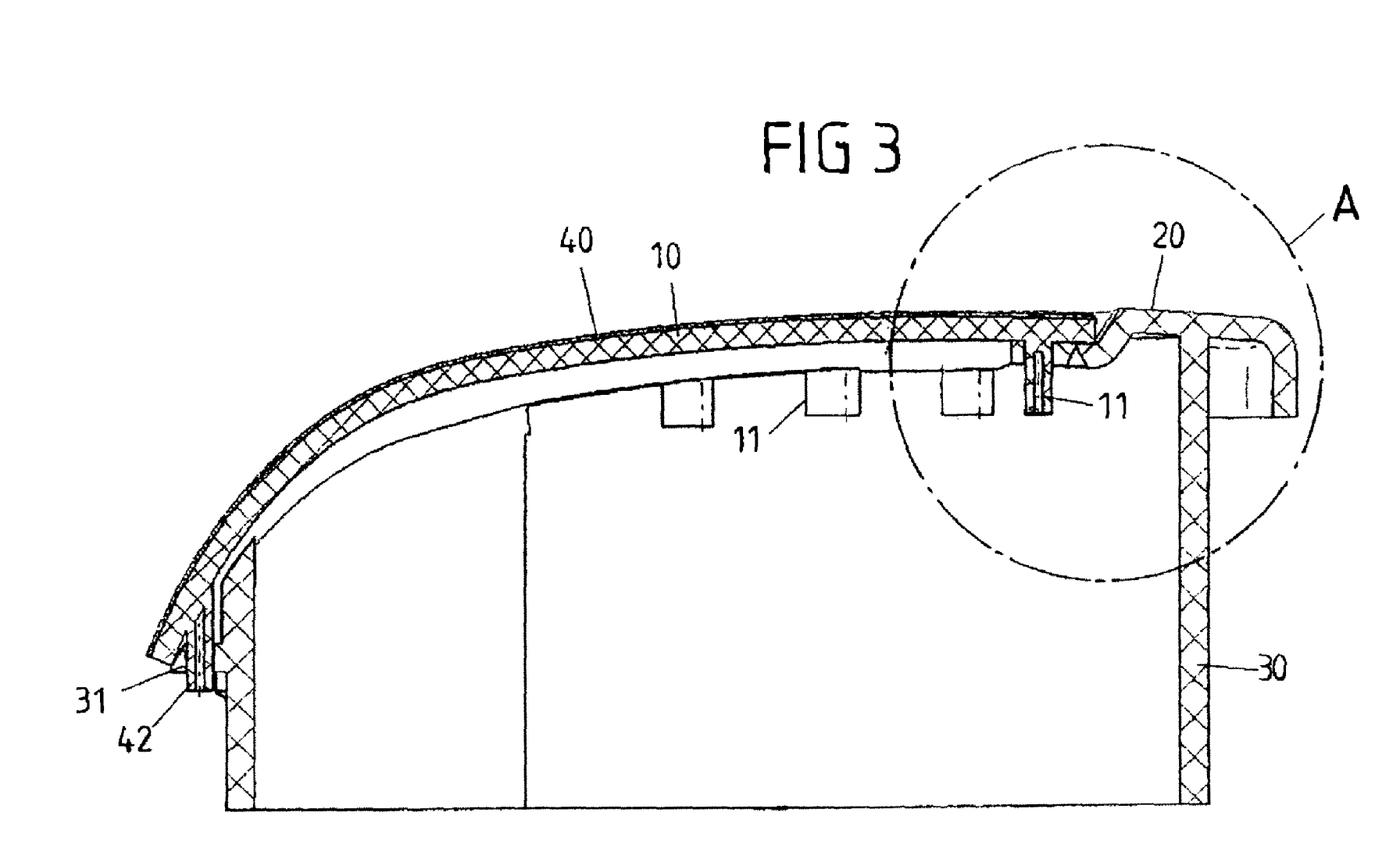
FIG. 3 shows a section cut through the airbag module of FIG. 1 along the line A-A.

FIG. 3 shows a sectional view of segments 10, 20 connected to each other. Here it can additionally be seen that the cover cap 10 is fastened pivotable on the module casing 30 on one of its edges 42 on a protrusion 31 of the module casing 30. Further can be seen the welding domes 11 of the cover cap 10. The plastic foil 40 forms the surface of the cover cap 10.

Figure 4:
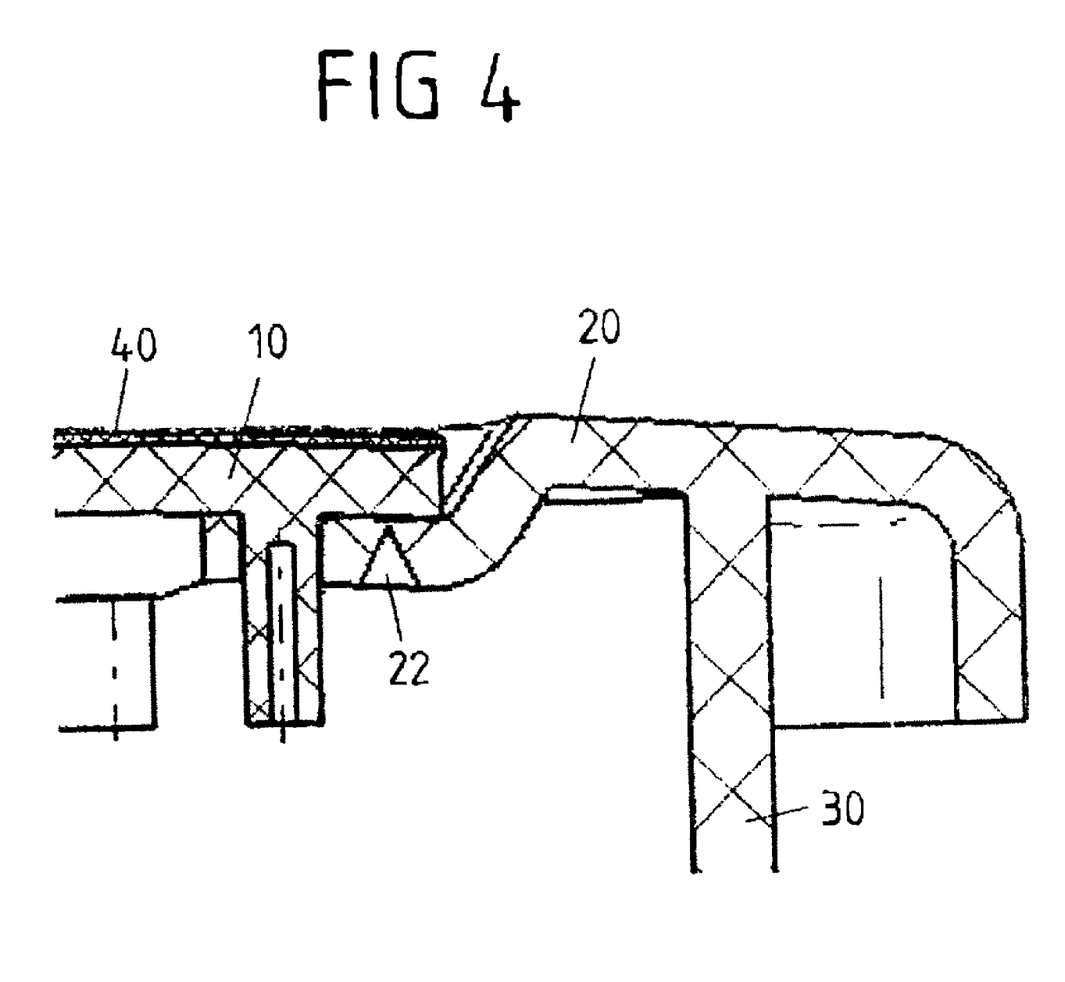
FIG. 4 shows an enlarged illustration of the area A of FIG. 3.

In the enlarged illustration of FIG. 4, illustrating the partial area A of FIG. 3, a tear line 22 can be seen, designed in the cap frame 20. Upon the unfolding of the airbag, located in the module casing 30, in the event of deployment the casing tears open along the tear line 22, whereupon the cover cap 10, which is now only fastened on the one edge 42 on the module casing 30, swings open. The tearing open of the tear line 22 here does not affect the interfaces 10a, 20a, being designed independent of the tear line 22, which do not open.

Figure 5:
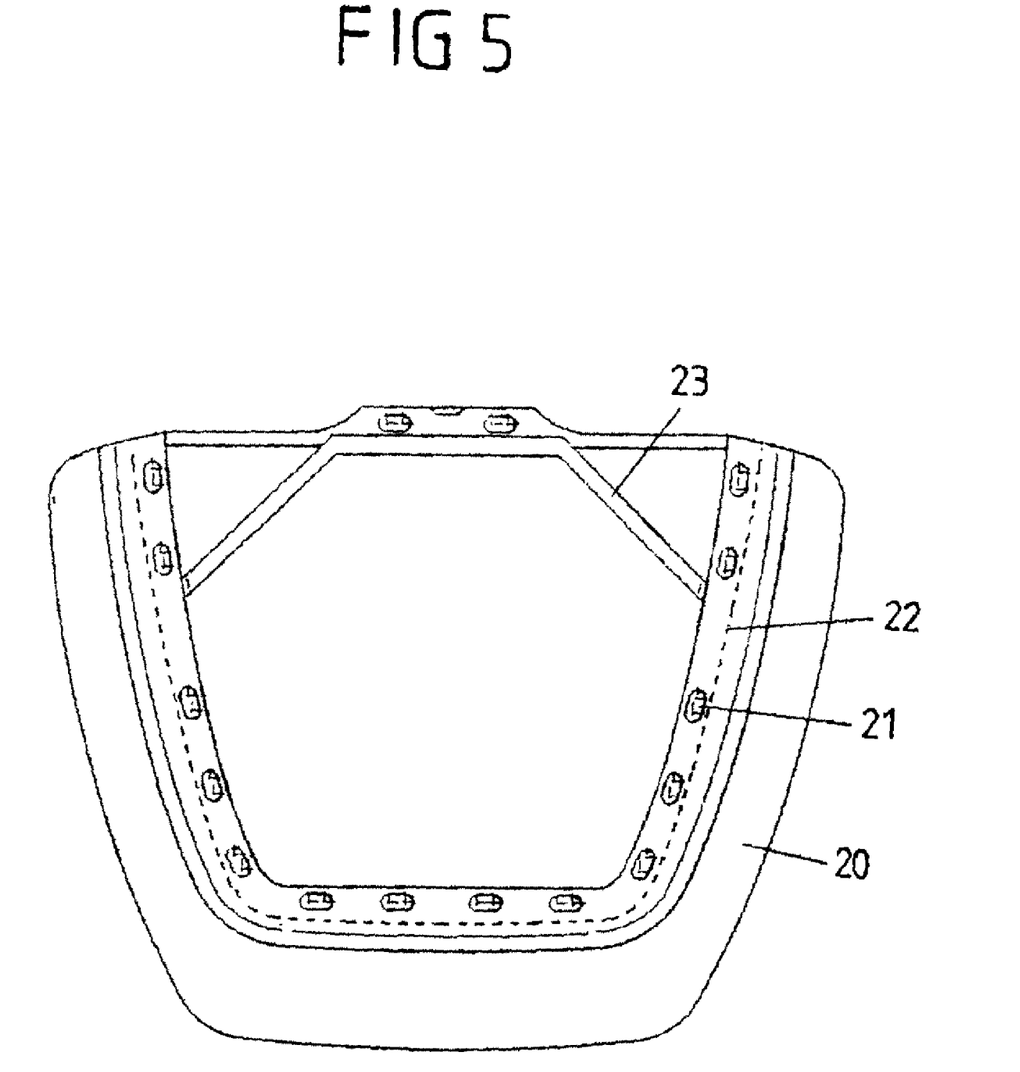
FIG. 5 shows in top view the cap frame of the airbag module of FIGS. 1 to 4.

The tear line 22 can likewise be seen in the top view of FIG. 5 on the cap frame 20. It is designed in such a way in the cap frame 20 that the recesses 21 of the mechanical interfaces 10a, and with that the fastening points between the cap frame 20 and the cover cap 10, in the event of deployment tear off along with the cover cap 10, without the fastening points opening here. The number, shape and position of the recesses 21 or fastening points can be chosen depending on the shape, size and the weight of the cover cap 10. In the illustration of FIG. 5, furthermore, side walls 23 of the cap frame 20 can be seen, which structurally strengthen said cap frame 20.

It is pointed out that the transition between the segment 10, furnished with the plastic foil 40, is clearly marked-off from the adjacent cap frame 20 on account of the pre-application of the plastic foil 40. This enhances the clarity and the elegance of the design.

It is further pointed out that the plastic foil 40 additionally conceals the connecting area between the cover cap 10 and the cap frame 20, i.e. the interfaces 10a, 20a (compare FIG. 2). Optically detecting the connecting area, which is aesthetically disadvantageous, is thus prevented. Correspondingly, the tear line 22 of the cap frame 10 can also be designed to be perforated, as indicated in FIG. 5, whereby the tear line 22 is made available in a simple manner. The formation of the tear line 22 as perforation is possible because said tear line is covered by the cover cap 10 with the plastic foil 40.

In an alternative embodiment (not illustrated) the tear line can be designed to be in the cover cap 10 instead of in the cap frame 20. Upon tearing open the tear line the fastening points between the cap frame 20 and the cover cap 10 remain on the cap frame 20, without the fixing points opening. In this case also a configuration of the tear line by a perforation is possible. The optically concealing plastic foil 40 in turn prevents a visibility of the tear line here. In the event of deployment the tearing open of the cover cap takes place through the covered area, i.e. the connection between the cover cap 10 and the plastic foil 40 is likewise torn open.

Differing from FIGS. 3 and 4, in a further alternative embodiment (not illustrated) the tear line does not follow essentially the segment boundaries or the connecting line of two segments, but instead takes a course diverging from that. It can here extend through one or multiple segments. It is here preferably optically concealed by a plastic foil or by another surface material which, in the event of tearing open is likewise torn open. Due to the separate formation of the tear line and the mechanical interfaces for connecting the segments, the segment boundaries and styling areas of the visible surface defined by said boundaries can be chosen independently of the opening area for the airbag.

In a further alternative embodiment (not illustrated) the surface of the cover cap 10 is not refined by a plastic foil, but by another material such as for example a fabric or a leather cutting.

The invention is in its embodiment not restricted to the exemplary embodiments illustrated above which are to be understood merely as examples. For example, the visible surface can be formed by segments which are shaped in another manner or the connection of the individual segments can take place in another manner than described. It is further pointed out that the present invention was explained with the help of a driver airbag module, the invention can, however, equally be realized with other airbag modules having a visible surface, in particular a passenger airbag module or a knee airbag module.

The priority application German Patent Application Number 10 2009 030 149.6; filed Jun. 19, 2009 is incorporated by reference herein.

The invention claimed is:

1. An airbag module for a vehicle occupant restraint system comprising:
    an airbag; and
    a visible surface, facing the vehicle interior when installed,
        wherein the visible surface is formed by different segments of the airbag module,
    wherein at least two of the segments have optically different surfaces, haptically different surfaces, or a combination thereof,
    wherein the at least two of the segments each have at least one mechanical interface configured to mechanically connect to at least another of the at least two of the segments, forming a connecting area,
    wherein at least one of the at least two of the segments has at least one tear line,
    wherein, upon tearing open the tear line in an event of deployment, an opening in the visible surface is produced, through which the airbag can exit the airbag module, and
    wherein the mechanical interfaces of the at least two of the segments are designed in such a way that, upon tearing open the tear line, the mechanical interfaces endure and do not open,
    wherein the tear line runs along its complete length along one of the mechanical interfaces.

2. The airbag module according to claim 1, wherein the tear line runs along a connecting line, provided by the mechanical interfaces, between one of the at least two of the segments and another of the at least two of the segments.

3. The airbag module according to claim 1, wherein the tear line essentially runs along at least one segment boundary.

4. The airbag module according to claim 1, wherein the different segments are formed by a cover cap, which in the event of deployment swings open, tears open, or a combination thereof at least in part, by visible areas of a module casing of the airbag module, or a combination thereof.

5. The airbag module according to claim 4, wherein the visible surface is formed by one of the at least two of the segments, formed by the cover cap, and the other of the at least two of the segments, formed by a cap frame formed on the module casing.

6. The airbag according to claim 1, wherein the different segments are formed by different segments of a cover cap of the airbag module.

7. The airbag module according to claim 1, wherein the mechanical interfaces of the at least two of the segments comprise recesses and protrusions that are fastened together by welds, rivets or adhesive.

8. The airbag module according to claim 1, wherein the mechanical interfaces for connecting the at least two of the segments have positive locking elements.

9. The airbag module according to claim 1, wherein at least one of the segments has a basic material and a surface material located on a whole surface of the basic material.

10. The airbag module according to claim 9, wherein the surface material is back injection molded with an injection molding material as the basic material.

11. The airbag module according to claim 9, wherein the surface material is a plastic foil, a fabric or a leather cutting.

12. The airbag module according to claim 9, wherein the tear line runs in the basic material of the at least one of the at least two of the segments and is visually concealed by the surface material.

13. The airbag module according to claim 1, wherein the different segments have surfaces which differ in that the surfaces have a different surface material, a different coat of varnish, or a combination thereof.

14. An airbag module for a vehicle occupant restraint system comprising:
an airbag;
a module casing; and
a visible surface, facing the vehicle interior when installed, wherein the visible surface is formed by different segments of the airbag module,
wherein the different segments comprise:
a first segment formed by a cover cap which in an event of deployment swings open, tears open or a combination thereof at least in part, and
a second segment formed by a cap frame formed on the module casing,
wherein the first and second segments have optically different surfaces, haptically different surfaces, or a combination thereof,
wherein the first and second segments each have a mechanical interface configured to mechanically connect the first and second segments to each other,
wherein at least one of the first and second segments has at least one tear line,
wherein, upon tearing open the tear line in the event of deployment, an opening in the visible surface is produced, through which the airbag can exit the airbag module, and
wherein the mechanical interfaces of the first and second segments are designed in such a way that upon tearing open the tear line the mechanical interfaces endure and do not open,
wherein the tear line runs along the mechanical interface of at least one of the first and second segments.

15. The airbag module according to claim 14, wherein the tear line runs along its complete length along the mechanical interface of the at least one of the first and second segments.

16. The airbag module according to claim 14, wherein the first segment formed by the cover cap comprises a basic material and a surface material located on a whole surface of the basic material.

* * * * *